G. W. HOWDEN.
AUTOMATIC RELEASE COUPLING.
APPLICATION FILED MAR. 28, 1921.

1,415,646.

Patented May 9, 1922.

INVENTOR.
G. W. Howden
By
Denison Thompson
ATTORNEYS.

UNITED STATES PATENT OFFICE.

GEORGE WILBER HOWDEN, OF POMPEY, NEW YORK.

AUTOMATIC RELEASE COUPLING.

1,415,646.　　　　　Specification of Letters Patent.　　Patented May 9, 1922.

Application filed March 28, 1921. Serial No. 456,424.

*To all whom it may concern:*

Be it known that I, GEORGE W. HOWDEN, of Pompey, in the county of Onondaga, in the State of New York, have invented new and useful Improvements in Automatic Release Couplings, of which the following, taken in connection with the accompanying drawings, is a full, clear, and exact description.

This invention relates to certain improvements in automatic release coupling.

An object of the invention is to construct a coupling which will maintain itself in operable position under a pre-determined load, but will automatically uncouple, or release two united bodies or elements coupled together so as to prevent breakage of either, or both of said bodies or elements, when the load exceeds such pre-determined amount.

The other objects and advantages relate to the details of construction and operation of the device, as will more fully appear from the following description, taken in connection with the accompanying drawings, in which.

Figure 1:
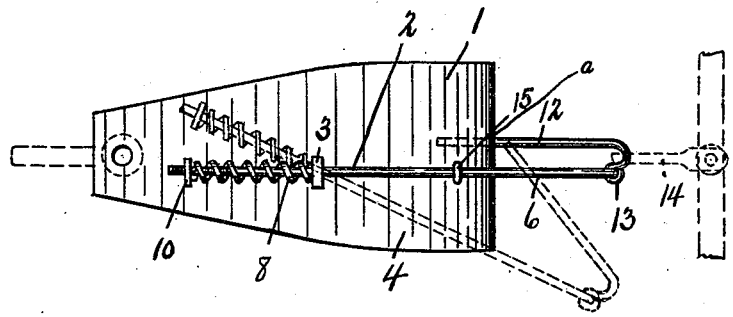
Figure 1 is a top plan view of the coupling.

While the coupling of this invention is capable of use in various places, for coupling together various elements, it is primarily designed to be used as a means for coupling a tractor to a plow, or other suitable agricultural implements, to automatically permit uncoupling of the two elements when one of them which being drawn by the other, is forcibly retarded in its movement, as for instance, when a plow strikes a rock or other object which increases the tractor load beyond a predetermined amount.

The coupling of this invention accomplishing the above object consists, as shown, of a U-shaped draft-plate —1— and a U-shaped draft bar —2—, the draft-plate being telescoped within the draft bar with its closed end towards the closed end of the draft bar, but spaced therefrom.

A transverse bar —3— extends through both legs —4— and —5— of the U-shaped draft-plate, and projects externally from both of said legs, and is provided with openings in such projecting parts, through which the respective legs —6— and —7— of the draft bar —1— extend, and the portions extending beyond the said transverse bar are provided with compression springs —8— and —9— respectively, capable of being properly tensioned by means of adjusting nuts —10— and —11— mounted upon the respective legs —6— and —7— of the draw bar —1—. The rear ends of the legs —4— and —5— of the draft plate are provided with registering openings adapted to receive a bolt, or other suitable device, for engaging a clevis or other attaching means with the coupling. This clevis may be used to connect the coupling to a tractor or other source of power.

For the purpose of connecting the draft bar —2— to the article to be drawn, as for instance, a plow, there is provided a coupling hook —12— which may have one end pivotally connected to the forward end of the draft bar —2— in any manner, as by the eye —13— shown. The extending end of this coupling hook is adapted to project through the forward end of the U-shaped draft plate —1— so that when the springs —8— and —9— are properly tensioned to maintain the draft plate —1— and the draft bar —2— in proper relative position the coupling hook —12— extends some distance through the forward end of the draft plate —1— so that it cannot move about its pivot on the forward end of the draft bar —1— to release the attaching member, as for instance, the clevis —14— shown in dotted lines, Figures 1 and 2.

The springs —8— and —9— should be of sufficient strength and maintained under sufficient tension to withstand any ordinary draft load. When, however, the element being drawn strikes an obstruction which prevents its further progress, the draft plate —1— and draft-bar —2— will move further apart against the action of the springs —8— and —9— until the coupling hook —12— is released from engagement with the draft plate —1—, at which time it will readily move about its pivot upon the forward end of the draft-bar —2—, and release the clevis or other attaching member —14— to automatically disconnect the tractor or other draft device from the element being drawn.

In addition, I have provided a U-shaped wire —15— which extends around the legs —6— of the draft bar —1—, and downwardly to the draft plate —1—, the ends —16— projecting from the lower lug —5— thereof. When it is desired to shift the forward end of draft bar —2— laterally, this U-shaped staple —15— can be withdrawn from the draft plate —1— with an upward movement.

It will be understood that the draft-plate —1— and the draft-bar —2— are resiliently connected together in an extensible manner, and by such a construction, that the resistance to their relative movement can be adjusted to meet the requirements of any particular pre-determined load.

Figure 2:
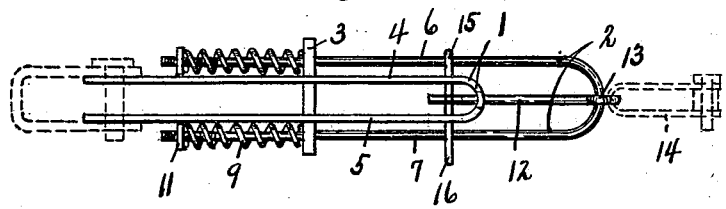
Figure 2 is a side elevation of the same.
Figure 3:
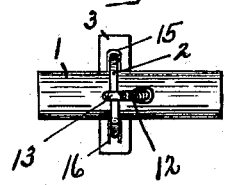
Figure 3 is a front view of the same.

In Figure 1 I have shown the U-shaped bar —2— in dotted lines in the position to which it may be thrown after the staple —15— has been withdrawn. This is to allow the operator to reinsert the coupling hook —12— into the opening —2— in the draft plate —1— without removing the springs —8— and —9—, after which the staple may then again be inserted in its position as shown. It will readily be seen that these springs must necessarily be of such tension that they could not be compressed by the hand of the operator sufficiently to reinsert the coupling hook —12— into said opening —2—.

Although I have shown and described a specific construction as illustrative of a perhaps preferred embodiment of my invention, I do not desire to limit myself to the same, as various changes may be made in the details of the form and arrangement of the parts without departing from the invention as set forth in the appended claims.

What I claim is:

1. An automatic coupling comprising a draft bar, a draft plate, a resilient connection between said draft bar and draft plate permitting relative extensible movement, removable means engaging the draft plate and draft bar for preventing angular rocking movement of the draft bar with respect to the draft plate, and a coupling hook pivotally connected to the draft bar having a part engaging the draft plate under normal load conditions, said part released from engagement with said draft plate by relative extensible movement of the draft bar and draft plate against the action of said resilient connection.

2. An automatic release coupling comprising a draft bar, a draft plate, a resilient connection between said draft bar and draft plate permitting relative extensible movement, a staple extending through the draft plate and engaging the draft bar to prevent angular rocking movement of the draft bar with respect to the draft plate, and a coupling hook pivotally connected to the draft bar and having a part engaging the draft plate under normal load conditions, said part released from said engagement by a relative extensible movement of the draft bar and draft plate against the action of said resilient connection.

In witness whereof I have hereunto set my hand this 19th day of March, 1921.

GEORGE WILBER HOWDEN.

Witnesses:
  FRED BUTTS,
  I. C. CHRYSLER.